No. 851,335. PATENTED APR. 23, 1907.
T. ANGERER.
ANIMAL TRAP.
APPLICATION FILED AUG. 16, 1906.
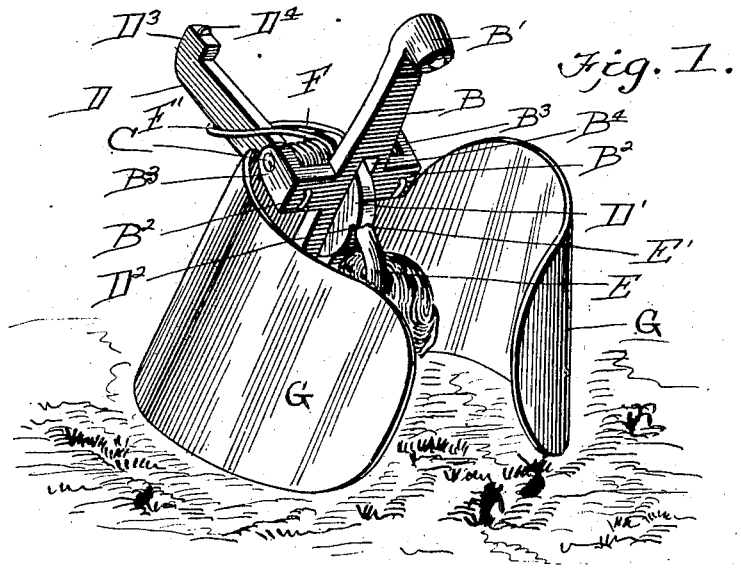
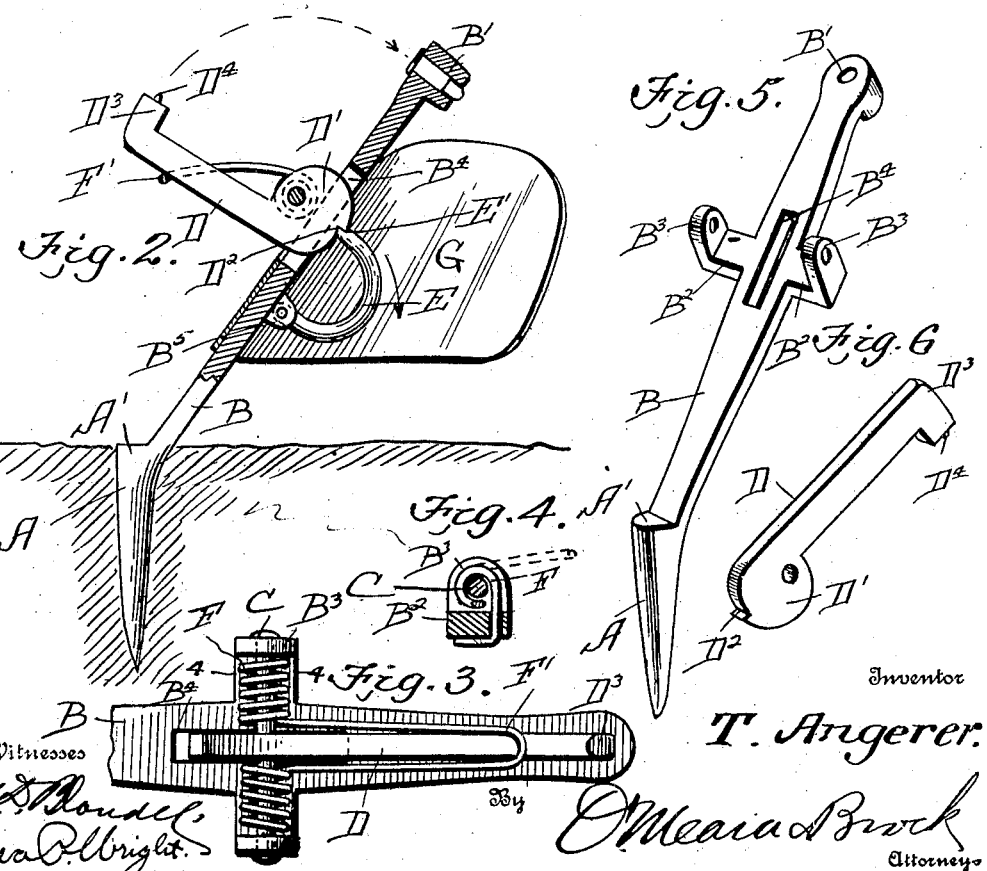
Inventor
T. Angerer.

UNITED STATES PATENT OFFICE.

THEODORE ANGERER, OF ERIE, PENNSYLVANIA.

ANIMAL-TRAP.

No. 851,335.  Specification of Letters Patent.  Patented April 23, 1907.

Application filed August 16, 1906. Serial No. 330,845.

*To all whom it may concern:*

Be it known that I, THEODORE ANGERER, a citizen of the United States, residing at Erie, in the county of Erie and State of Pennsylvania, have invented a new and useful Improvement in Animal-Traps, of which the following is a specification.

This invention relates to animal traps and more particularly to trap guns, the object being to provide a trap gun which is very simple and cheap in construction and one which is very effective in use.

Another object of my invention is to provide a trap which can be readily carried from place to place and one which is easily and quickly set without any danger.

This invention consists of the novel features of construction, hereinafter fully described and pointed out in the claims.

In the drawings forming a part of this specification:—Figure 1 is a perspective view of my improved trap set. Fig. 2 is a vertical sectional view through the same. Fig. 3 is a detail plan view. Fig. 4 is a section taken on lines 4—4 of Fig. 3. Fig. 5 is a perspective view of the spike and arm. Fig. 6 is a perspective view of the hammer.

In the drawings A indicates a spike adapted to be forced into the ground by placing the foot on the head A', and pressing downwardly. An arm B projects upwardly at an angle from the head A' and is provided with a cartridge chamber B' at its end. Apertured arms B² project out from each side of the arm B provided with angled apertured ends B³ in which is secured a bolt C on which is mounted the enlarged apertured end D' of the hammer D which extends through a slot B⁴ in the arm B and is provided with the usual notch D² adapted to be engaged by the notched end E' of a bowed trigger E, mounted on a pin between the spiral apertured lugs B⁵ formed on the under side of the arm B.

The hammer D is provided with an angled head D³ having a firing pin D⁴ formed thereon adapted to strike the cartridge in the chamber B'. A coil spring F surrounds the bolt C having its ends recessed in the apertures in the arms B² and is provided with a loop portion F' fitting over the hammer adapted to throw the hammer against the cartridge in the chamber with enough force to set the same off and to prevent the cartridge from flying out backwards.

A shield is secured to the arm B forming wings G, which extend out around the trigger so that the animal will have to pass between the wing under the cartridge chamber before it can reach the bait which is adapted to be secured on the trigger by passing the trigger through the same.

From the foregoing description it will be readily seen that I have provided a trap gun so constructed that the animal will have to pass under the cartridge chamber to reach the bait.

Having thus fully described my invention, what I claim as new and desire to secure by Letters Patent, is:—

1. In a device of the kind described the combination with an arm provided with a cartridge chamber, of a hammer and trigger pivoted to said arm and wings extending out from said arm for the purpose described.

2. In a device of the kind described the combination with a spike provided with an arm having a cartridge chamber formed in its end, of a hammer pivoted to said arm below said chamber, and a trigger pivoted to said arm adapted to engage said hammer for the purpose described.

3. In a device of the kind described the combination with an arm provided with a cartridge chamber at its end, of a hammer pivoted to said arm, a shield secured to said arm and a bowed trigger pivoted to said arm adapted to engage said hammer for the purpose described.

4. In a device of the kind described the combination with a spike provided with an upwardly projecting arm having a cartridge chamber formed therein, a spring actuated hammer mounted on said arm, and a bowed trigger pivoted to the under side of said arm adapted to engage said hammer for the purpose described.

5. In a device of the kind described the combination with a spike having an arm projecting upwardly from its head provided with a cartridge chamber, a notched spring actuated hammer mounted on said arm, a bowed trigger pivoted to the under side of the said arm, and wings extending out from said arm to each side of said trigger for the purpose described.

6. In a device of the kind described the combination with a spike provided with an upwardly projecting arm having a slot formed therein, and provided with a cartridge chamber, arms projecting outwardly from said arm provided with angled ends, a bolt received in said arm, a spring actuated hammer mounted on said bolt working in said slot and a trigger pivoted to said arm adapted to engage said hammer for the purpose described.

7. In a device of the kind described the combination with a spike provided with an upwardly projecting arm having a slot formed therein, and provided with a cartridge chamber, arms projecting from said arms provided with angled ends, a bolt secured in said ends, a hammer mounted on said bolt provided with an enlarged notched end working in said slot, and a bowed trigger pivoted to the under side of the said arm adapted to engage said notch for the purpose described.

8. In a device of the kind described the combination with a spike having an arm projecting upwardly therefrom provided with a slot, and provided with a cartridge chamber, arms projecting out from the sides of the said arms provided with angled ends, a bolt secured in said ends, a hammer mounted on said bolt provided with an enlarged notched portion, working in said slot, a bowed trigger pivoted between lugs on the under side of the said arm, and wings extending out from said arm to each side of the trigger.

THEODORE ANGERER.

Witnesses:
CHARLES A. MERTENS,
JACOB KOEPPEL.